United States Patent [19]

Williams

[11] Patent Number: 4,843,525
[45] Date of Patent: Jun. 27, 1989

[54] SOLAR POWERED YARD MARKER

[75] Inventor: Lloyd E. Williams, West Monroe, La.

[73] Assignee: Power Plus, Inc., West Monroe, La.

[21] Appl. No.: 141,822

[22] Filed: Jan. 11, 1988

Related U.S. Application Data

[63] Continuation-in-part of Ser. No. 34,709, Apr. 6, 1987, Pat. No. 4,751,622.

[51] Int. Cl.⁴ .................................. F21S 9/00
[52] U.S. Cl. ..................... 362/157; 362/145; 362/183; 40/564; 136/291
[58] Field of Search .............. 362/190, 191, 145, 431, 362/183, 152, 253, 153, 157, 812, 196; 40/553, 564, 565, 575, 576; 136/291

[56] References Cited

U.S. PATENT DOCUMENTS

| | | | |
|---|---|---|---|
| 1,761,868 | 6/1930 | Burke | 362/812 |
| 2,920,184 | 1/1960 | Kessler | 361/152 |
| 3,263,069 | 7/1966 | Krucki et al. | 362/431 |
| 3,317,809 | 5/1967 | Bowers et al. | 136/291 |
| 4,009,535 | 3/1977 | Stock | 40/546 |
| 4,611,265 | 9/1986 | Davis | 362/145 |
| 4,740,872 | 4/1988 | Chou | 362/183 |

Primary Examiner—Ira S. Lazarus
Assistant Examiner—D. M. Cox
Attorney, Agent, or Firm—David L. Ray

[57] ABSTRACT

A solar powered illuminated yard maker including a solar powered battery recharging network that recharges a storage battery at a constant rate and can be selectively operated to burn continuously to produce a continuous light or to burn intermittently to provide a flashing light. A solar cell recharges the storage battery in the light when sunlight is impinging upon the solar cell to provide virtually maintenance free and long term operation of the illuminated yard marker during the dark or twilight hours.

16 Claims, 3 Drawing Sheets

SOLAR POWERED YARD MARKER

CROSS-REFERENCE TO RELATED APPLICATION

This application is a continuation-in-part of co-pending U.S. patent application Ser. No. 07/34,709 filed Apr. 6, 1987, now U.S. Pat. No. 4,751,622 issued 12-22-87.

BACKGROUND OF THE INVENTION

1. Field of the Invention

The present invention is related to yard markers, and in particular to illuminated signs or markers used for placement on the yard or lawn of a residence or other building to indicate the street number of the building. Even more particularly, the invention is related to a storage battery powered illuminated yard marker having solar cells for charging the storage battery while the sun is impinging upon the solar cells.

2. Brief Description of the Prior Art

The illumination of yard markers is important in aiding a person to find a residence or other building when inadequate light is present in the vicinity of the yard marker to enable viewing of the numbers on the marker. Yard markers having battery powered lights therein work for a limited period of time and require constant and continuous service, such as battery replacement, or require, in the case of lights illuminated by alternating current, that a wire be run from an alternating current power source to the light. Such wires can be damaged by cutting the grass or driving vehicles in the area around the light, and they are expensive to install. Servicing of such alternating current and battery powered lights is costly and time consuming.

Exemplary of the prior art are the following patents listed in numerical order:

U.S. Pat. No. 4,482,941 discloses an improved barrier light assembly wherein a lens assembly composed of a pair of mating halves is secured to the upper portion of a base assembly by a threaded flanged collet. A peripheral outwardly extending integral neck of the lens assembly extends into the upper portion, and the collet threadably engages the neck. A pair of screw flights are employed which permits use of identical mating halves.

U.S. Pat. No. 4,481,562 discloses a solar power station for providing illumination including a storage battery-powered signaling element, a solar generator for recharging the storage battery and a bracket assembly for supporting the remainder of the components, the bracket assembly being light weight and supporting the solar generator in an orientation to provide adequate exposure to ambient light in a wide variety of sun positions. The apparatus is self-contained, independent in operation and can be left unattended for substantial periods of time.

U.S. Pat. No. 4,563,727 discloses a self-charging solar battery comprising a rechargeable nickel-cadmium cell and a solar electrical panel. Sunlight passing through the transparent housing excites the solar panel which then supplies recharging current to the nickel-cadmium cell.

U.S. Pat. No. 4,387,416 discloses a warning light housing including a light assembly used with street construction barricades, the base having a supporting platform with recesses in its upper surface, the recesses having access holes in the bottom leading into recesses from the exterior, the batteries blocking disassembly by limiting lateral movement of the casing relative to the base, and including a special tool insertable in the access holes of the light assembly to push the batteries out of the recesses to allow disassembly.

U.S. Pat. No. 4,122,396 discloses a stable solar power source for portable electrical devices including solar cells for converting sunlight into electrical energy and a large capacitor for providing a current reserve to satisfy peak current demands and offset the effects of sunlight variation, the solar cells being mounted beneath a light transmitting thermal shield to minimize thermally induced cell output variations.

U.S. Pat. No. 3,221,300 discloses a warning signal device for mounting on a construction barricade which may be easily disassembled for service, operates only while standing upright, shuts itself off when lying on its side, is impervious to moisture, dust, insects and other environmental factors, and a barricade to which the flasher construction may be mounted and attached thereto in a theft-proof manner.

U.S. Pat. No. 3,264,461 discloses a flasher warning light adapted to be mounted on highway construction barricades having an increased life and designed to substantially reduce mechanical fatigue of various parts of the assembly and breakage thereof resulting from shock loads including a battery case, means formed thereon for mounting the case on a road barrier, and a lamp head rotatably mounted on the casing containing a lamp which is energized by a battery mounted within the casing.

U.S. Pat. No. 3,180,979 discloses a warning light having increased brilliance which may be readily converted from a unidirectional light to bidirectional light having a removable reflector which can be stored in the case of the light when not in use.

SUMMARY OF THE INVENTION

In accordance with the present invention there is provided a solar powered illuminated yard marker including a solar powered battery recharging network that recharges a storage battery at a constant rate and can be selectively operated to burn continuously to produce a continuous light or to burn intermittently to provide a flashing light. A solar cell recharges the storage battery in the light when sunlight is impinging upon the solar cell to provide virtually maintenance free and long term operation of the illuminated yard marker during the dark or twilight hours when illumination is necessary to view the numbers on the yard marker.

The solar powered illuminated yard marker of the present invention can operate for extended periods of time with no maintenance. The solar cells continuously recharge the storage battery and the light when the rays of the sun impinge upon the solar cell.

The illuminated yard marker of the present invention is preferably made of materials which are corrosion resistant, enabling the light to be used for extended periods of time in corrosive atmospheres and environments. The illuminated yard marker of the present invention is preferably manufactured from ultra violet stabilized highly impact resistant plastic so that the yard marker of the present invention will resist environmental stress cracking and the effects of weather. The illuminated yard marker of the present invention does not contain any busbars contacting any battery contacts thereby eliminating corrosion of contacts. The battery is sealed and no discharge of acid occurs, therefore preventing corrosion of the yard marker throughout its life.

BRIEF DESCRIPTION OF THE DRAWINGS

The invention will be more clearly understood by reference to the drawings in which.

DESCRIPTION OF THE PREFERRED EMBODIMENTS

Figure 2:
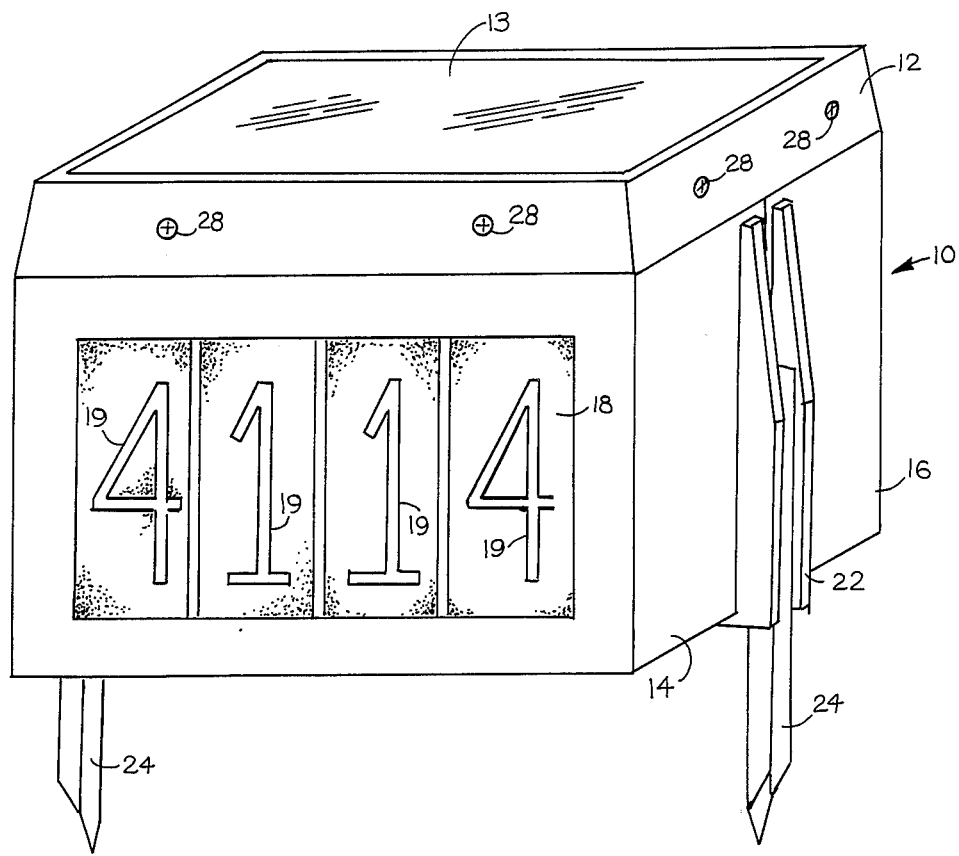
FIG. 2 is a perspective assembly view of the illuminated yard marker of the present invention.
Figure 3:
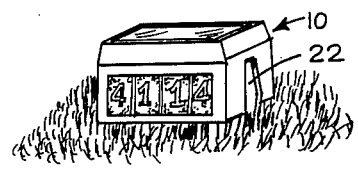
FIG. 3 is a perspective assembly view of the yard marker of the present invention placed in position for operation on the grass covered lawn commonly found in the front of a residence or other building.

Referring now to the drawings, the illuminated yard marker of the present invention is generally indicated by the numeral 10. The yard marker of the present invention can be seen in FIG. 2 to include a top, generally rectangular portion 12 having a transparent cover 13 therein for admitting rays of the sun to a solar cell 15 shown in FIG. 1. Top 12 rests upon front body half 14 and rear body half 16. Front body half 14 has a transparent window 18 which fits therein to display indicia 19. Attached to each side of front and rear body halves 14 and 16 are two stake holders 22-22. Received in stake holder 22 are two stakes 24-24 which are inserted into the ground as indicated in FIG. 3 to hold the yard marker securely to the ground. If it is desired to attach the yard marker to concrete, wood or another type of base, a suitable attachment means known to those skilled in the art may be utilized such as bolts, straps or the like.

Figure 1:
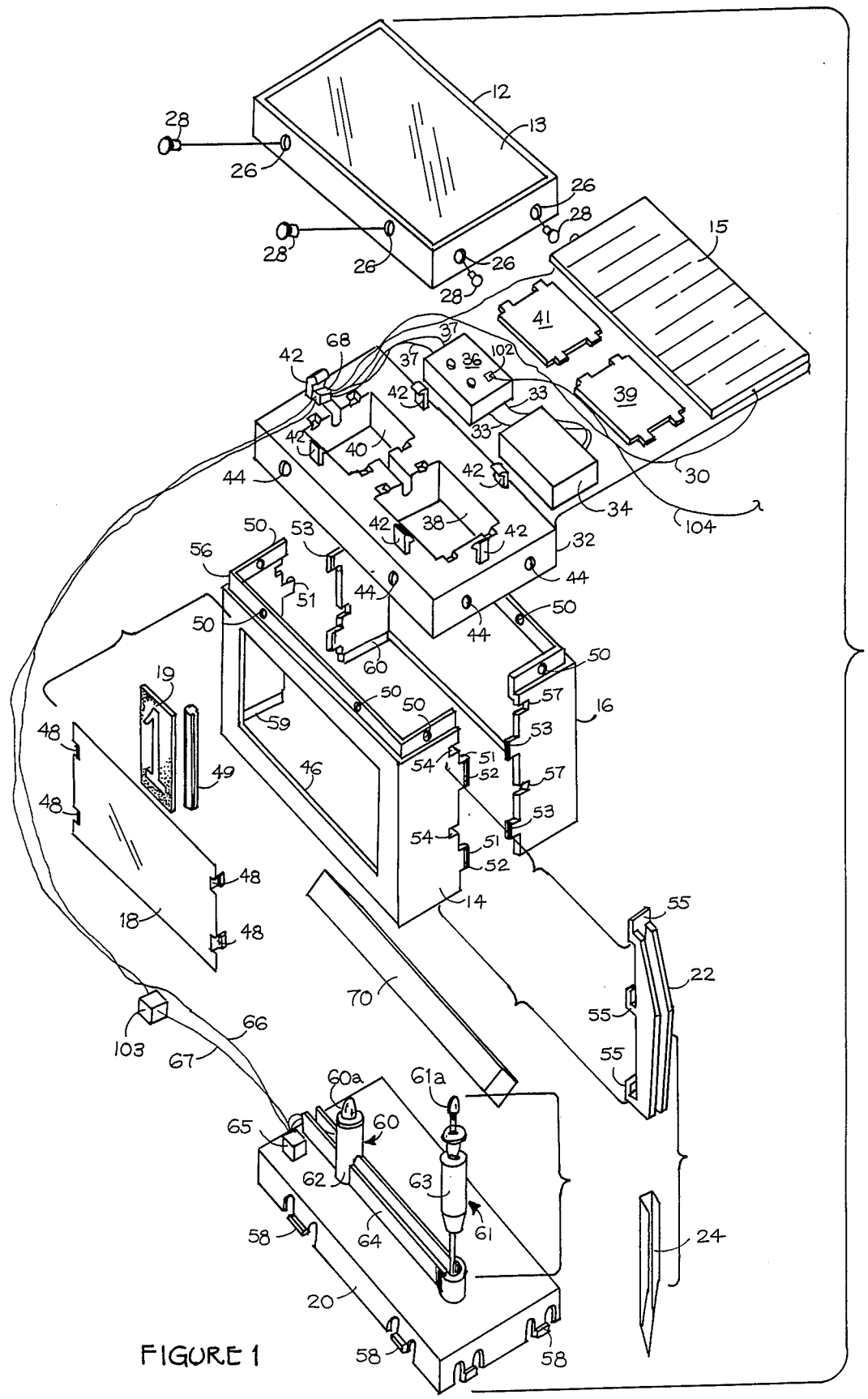
FIG. 1 is a exploded, perspective view of the illuminated yard marker of the present invention.

Referring now to FIG. 1, top 12 has a series of holes 26 therein which are adapted to receive pins 28. Pins 28 may be any suitable force-fitted pins known to those skilled in the art or could be replaced with screws or any other fastening devices if desired.

Located immediately beneath transparent sheet 13 of top 12 is solar cell 15 which is connected by two wires 30 and 31 at junction 68 to battery holder and printed circuit board holder 32 hereinafter referred to as holder 32. Also, electrically connected to holder 32 at junction is battery 34 and printed circuit board 36. Battery 34 is electrically connected by wires 33-33 to circuit board 36, and printed circuit board 36 is electrically connected to junction 68 through wires 37-37. Preferably, switch 102 is connected to printed circuit board and can be remotely actuated through wire 104 to change lamp assemblies 60 and 61 from a continuously burning mode to a flashing mode. Switch 103 is attached to wire 67 and can be actuated to connect and disconnect light assemblies 60 and 61 from battery 34.

Battery 34 fits into recess 38 in holder 32 and is held in place by snap cover 39 which is force fitted into recess 38 after battery 34 is placed therein. Printed circuit board is likewise held in recess 40 by snap cover 41 after placing battery 34 and printed circuit board 36 in recesses 38 and 40 respectively. Snap covers 41 and 39 are placed in recesses 38 and 40 respectively and solar cell 15 is held in place by detents 42 rigidly connected to holder 32. Holder 32 has a series of holes 44 therein for receipt of pins or fasteners 28.

Front body half 14 can be seen to have a rectangular opening 46 therein into which can be inserted transparent window 18 for display of indicia 19. Transparent window 18 is held in opening 46 by detents 48. Indicia 19 can be separated by separators 49 to allow a plurality of indicia to be used as required to indicate the street number of the house or building being marked.

Front body half 14 has a series of holes 50 therein for receipt of pins 28. Front half 14 also has tabs 51 having holes 52 therein for receipt of male detents 53 located on rear body half 16. Front body half 14 also has slots 54 therein for receipt of "L" shaped holders 55 located on stake holders 22. Front body half 14 also has a recessed vertical ridge 56 which runs around the upper periphery thereof and is adapted to be received within holder 32. Rear body half 16 has male detents 53 thereon and slots 57 therein for receipt of "L" shaped holder or legs 55 on stake holder 22.

Base 20 is adapted to be received within the lower portion of front body half 14 and rear body half 16 and is generally rectangular in shape. Base 20 has detents 58 which are force fitted in the lower portion of front body half 14 and rear body half 16 and snap against recess 59 in front body half 14 and recess 60 in rear body half 14.

On the top of rectangular base 20 are located preferably two light bulb assemblies 60 and 61 having light bulbs 60a and 61a which are conventional light bulb assemblies and have holders 62 and 63 which are received on rack 64. Light assemblies 60 and 61 are electrically connected to a plug or junction 65 which is in turn electrically connected by wires 66 and 67 to printed circuit board 36 through junction 68.

Preferably a light diffusing bar 70 is snapped on top of light assembly 60 and 61. After the yard marker 10 is assembled as shown in FIG. 2, stakes 24 may be inserted in stake holder 22 and the yard marker placed in the ground as shown in FIG. 3.

To assemble the illuminated yard marker 10 shown in FIG. 1, printed circuit board 36 and rechargeable storage battery 34 are inserted into recesses 40 and 38, respectively, of holder 32, and snap covers 41 and 39 are snapped into position on holder 32. Solar cell 15 is then placed on top of holder 32, and holder 32 and solar cell 15 are then inserted inside the top end of halves 14 and 16 with holes 44 of holder 32 in alignment with holes 50 of halves 14 and 16. Wires 66 and 67 are placed inside halves 14 and 16 and "L" shaped legs 55 of stake holders 22 are placed in slots 54 and 57 of halves 14 and 16. Halves 14 and 16 are forced together to lock male detents 53 into holes 52 on tabs 51. Top 12 is then placed on top of halves 14 and 16 in recess 56 to align holes 26 in top 12 with holes 50 and 44. Pins or fasteners 28 are then forced into holes 26, 50 and 44 to lock the assembly together.

Indicia 19 are then inserted into opening 46 and window 18 is placed in opening 46 by forcing detents 48 therein. Indicia 19 may be fastened to window 18 by gluing or the like, or indicia 19 may be force fitted into opening 46 and spaced apart by separators 49 which can be force fitted into opening 46. Base 20 is then inserted into the bottom end of halves 14 and 16 until detents 58 snap into recesses 59 and 60 of halves 14 and 16 respectively. Light diffusing bar 70 may then be placed on light bulbs 60a and 61a and stakes 24 force fitted into stake holders 22.

Figure 4:
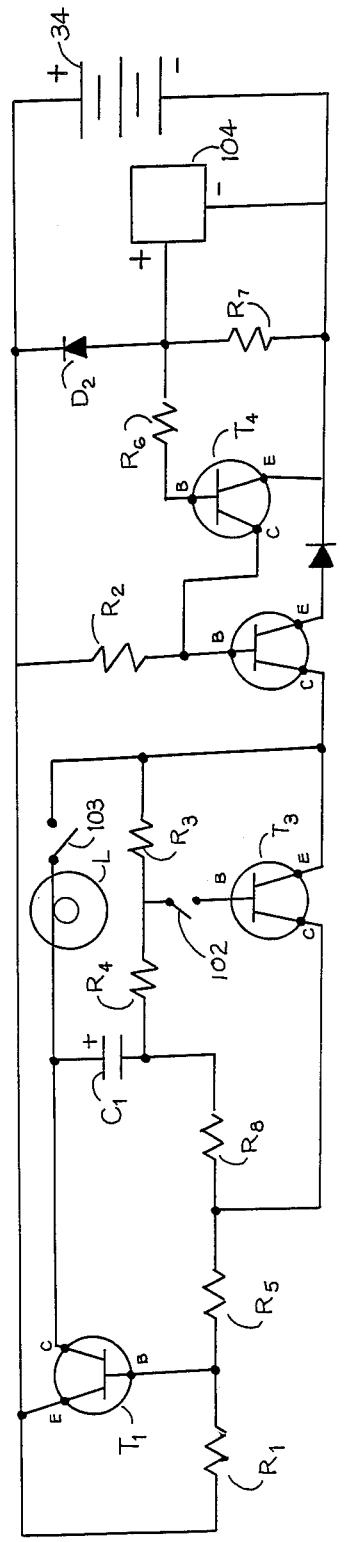
FIG. 4 is a schematic view of a circuit diagram of the electrical circuitry of the present invention.

The circuitry utilized in the construction of the invention will be more clearly understood by referring to FIG. 4, which is a schematic of the circuitry on printed circuit board 36. When a voltage is applied by battery 34 at the indicated polarity by closing switch 103, and when switch 102 is closed, current flows from battery 34 through resistors $R_1$, $R_5$, $R_8$, $R_4$, $R_3$ to bias transistor $T_1$ through point B on $T_1$, thereby causing electrical current to flow from point E to C of transistor $T_1$ and on through lamp L to point C of transistor $T_2$ $R_8$ is of sufficiently high resistance so that initial current will not bias $T_3$. Switch 103 can be operated remotely by connecting a wire thereto to actuate the switch, or switch 103 could be a manual switch. At the same instant $T_2$ is biased through resistor $R_2$ so that transistor $T_2$ will conduct current from point C to point E of $T_2$, through diode $D_1$ to the negative pole of battery 34, thereby causing lamp L to emit light. $R_2$ is preferably 3.3 ohms, $R_1$ is preferably 1 ohm, $R_3$ is preferably 68 ohm, $R_4$ is preferably 5.1 ohms, $R_5$ is preferably one ohm, and $R_8$ is preferably 120 ohms. Lamp L corresponds to light assemblies 60 and 61.

When $T_1$ begins conducting to light lamp L, capacitor $C_1$ begins to charge, and current flows through resistor $R_3$ and $R_4$. When $C_1$ reaches a fully charged state, a voltage potential is reached at point B of transistor $T_3$ thereby drawing current through $R_5$ and dropping the voltage at point B of $T_1$ to the point that $T_1$ ceases to conduct from point E to point C of $T_1$, at which point lamp L no longer emits light.

This on/off cycle repeats itself and is dependent on the value of $C_1$, $R_3$, and $R_4$. Preferably, $C_1$ is 10 picofarads. If it is desired to operate lamp L continuously, switch 102 is opened.

When voltage is applied by solar cell 15 at the polarity indicated in the drawings, current flows through diode $D_2$ to the positive pole of battery 34 to charge battery 34 and through variable resistor $R_6$ to bias transistor $T_4$ so that current is conducted from point C to point E of $T_4$ thereby shutting $T_2$ off so that as long as this condition is occurring, the lamp circuit will be turned off and the battery will be recharged from the solar cell 15. $R_6$ controls the biasing of $T_4$ thereby allowing the turning on or off of the lamp circuit to be controlled. $R_7$ acts as an input load stabilizer for solar cell output. $R_6$ is preferably 10 ohms, and $R_7$ is preferably 100 ohms.

The circuitry of the present invention thus allows the yard marker to be operated continuously when switch 102 is turned on, or intermittently if it is desired to flash the yard marker light. The ability to flash the yard marker light is important if it is desired to signal parties such as policeman or security officers. In the event of a emergency within the building, by activating the flashing circuit an emergency can be indicated outside the building thus alerting security guards or police in the area to the building or residence.

Although the preferred embodiments of the present invention have been disclosed and described in detail above, it should be understood that the invention is in no sense limited thereby, and its scope is to be determined by that of the following claims.

What is claimed is:

1. A self charging illuminated yard marker assembly comprising, in combination:
   a. An indicia display assembly comprising:
      (1) a pair of light emitting assembly enclosing halves which are matingly and abuttingly engaged with one another along opposed vertical, peripheral edge portions to define an interior chamber therebetween, one of said halves having transparent window means therein for displaying indicia means, each of said halves having a top end, a bottom end, and a plurality of holes therein for receipt of fastener means,
      (2) connecting means for connecting said halves together,
      (3) light emitting assembly means located in said interior chamber of said halves,
   b. a top assembly for holding solar cell means comprising:
      (1) a generally rectangular top for connection to the top ends of said halves, said rectangular top having a transparent sheet in the upper portion thereof,
      (2) solar cell means located in said top beneath and adjacent to said transparent screen,
      (3) holder means located in said top beneath said solar cell means for holding and supporting said solar cell means,
   c. solar cell means connected to said holder means,
   d. rechargeable storage battery means connected to said holder means,
   e. base means connectable to said bottom ends of said halves for receiving and holding said light emitting assembly means,
   f. means for electrically connecting said storage battery means to said light emitting assembly means, and
   g. means for electrically connecting said solar cell means to said storage battery means.

2. The yard marker assembly of claim 1 wherein said holder means has a plurality of holes therein aligned with said holes in said halves for receipt of fastener means.

3. The yard marker assembly of claim 2 wherein said top has a plurality of holes therein aligned with said holes in said halves and said holes in said holder means for receipt of fastener means.

4. The yard marker assembly of claim 1 wherein said base means is generally rectangular in shape.

5. The yard marker assembly of claim 4 wherein said base means has a generally rectangular bottom.

6. The yard marker assembly of claim 5 wherein said base means has fastener means connected thereto for connecting said base means to said halves.

7. The yard marker assembly of claim 6 wherein said light emitting assembly means extend upwardly from said bottom of said base means.

8. The yard marker of claim 1 wherein stake means are connected to said halves for connecting said yard marker assembly to the ground.

9. The yard marker of claim 1 wherein said base means is received in the bottom end of said halves.

10. The yard marker assembly of claim 9 wherein said halves have recess means in the bottom end thereof for receipt of fastener means connected to said base means.

11. The yard marker assembly of claim 10 wherein said halves have recess means in the top thereto for receipt of said top.

12. The yard marker assembly of claim 1 wherein indicia means are connected to said one of said halves having window means therein.

13. The yard marker assembly of claim 12 wherein said indicia means are adjacent to said window means.

14. The yard marker assembly of claim 1 wherein stake holding means are attached thereto for connecting said assembly to the ground or desired location.

15. The yard marker assembly of claim 13 wherein said stake holding means are connected to said halves of said yard maker assembly.

16. The yard marker assembly of claim 15 wherein stake means are connected to said stake holding means for connecting said yard marker assembly to a desired object.

* * * * *